(12) United States Patent
Takahata (10) Patent No.: US 8,608,152 B2
(45) Date of Patent: Dec. 17, 2013

(54) SHEET CONVEYOR DEVICE AND IMAGE-READING DEVICE

(75) Inventor: Muneaki Takahata, Toyoake (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/617,399

(22) Filed: Sep. 14, 2012

(65) Prior Publication Data

US 2013/0168916 A1   Jul. 4, 2013

(30) Foreign Application Priority Data

Dec. 28, 2011   (JP) ................................ 2011-287876

(51) Int. Cl.
*B65H 5/22*   (2006.01)
*B65H 83/00*   (2006.01)
*B65H 85/00*   (2006.01)
*B65H 31/04*   (2006.01)

(52) U.S. Cl.
USPC ......................................... 271/3.14; 271/213

(58) Field of Classification Search
USPC .................. 271/3.14, 207, 213; 399/367, 380
See application file for complete search history.

(56) References Cited

U.S. PATENT DOCUMENTS

2002/0056957 A1   5/2002   Sekine
2012/0155941 A1*  6/2012   Kozaki et al. ................. 399/367

FOREIGN PATENT DOCUMENTS

| JP | 2001206610 A | 7/2001 |
| JP | 2001302062 A | 10/2001 |
| JP | 2002145457 A | 5/2002 |
| JP | 2003201054 A | 7/2003 |

* cited by examiner

*Primary Examiner* — David H Bollinger
(74) *Attorney, Agent, or Firm* — Banner & Witcoff, Ltd.

(57) ABSTRACT

A sheet conveying device is provided that may include a sheet receiving portion having a movable member, a protruding portion and a recessed portion. The protruding portion may protrude from an upper portion of a sheet receiving surface of the movable member when the movable member is located in one position. When a document is discharged from an outlet port onto the sheet receiving surface of the movable member, the protruding portion may come into contact with a leading edge of a sheet. When the movable member is located in another position, the recessed portion may receive the protruding portion therein.

20 Claims, 4 Drawing Sheets

L # SHEET CONVEYOR DEVICE AND IMAGE-READING DEVICE

CROSS-REFERENCE TO RELATED APPLICATION

This application claims priority from Japanese Patent Application No. 2011-287876, filed on Dec. 28, 2011, which is incorporated herein by reference.

FIELD OF DISCLOSURE

The disclosure relates to a sheet conveyor device that conveys a sheet along a predetermined conveying path and an image-reading device having a configuration similar to the sheet conveyor device.

BACKGROUND

In a known image-reading device including an automatic document feeder ("ADF"), a sheet feed tray and a sheet discharge tray serve as exterior covers when the image-reading device is not used.

This configuration reduces a protruding amount of the image-reading device on an upper-surface side in a height direction when the image-reading device is not used. Further, the sheet feed tray and the sheet discharge tray do not get in the way when they are not used. When the sheet feed tray and the sheet discharge tray serve as the exterior covers, the sheet feed tray and the sheet discharge tray cover a sheet feed opening and a sheet discharge opening, respectively. Thus, entry of foreign matter can be reduced or prevented.

SUMMARY

The known ADF is configured to convey a plurality of documents one by one and discharge the documents successively onto the sheet discharge tray. When the documents are successively discharged onto the sheet discharge tray, one or more previously-discharged documents placed on the sheet discharge tray may be further pushed downstream in a document conveying direction by friction caused between the previously-discharged document and the next-discharged document.

This situation may repeatedly occur every time a document is discharged onto the sheet discharge tray. For example, on the sheet discharge tray, a first discharged document may be pushed by a second discharged document that is pushed by a third discharged document. The earlier discharged documents may tend to be pushed downstream more. In some cases, one or more documents may partially protrude out of the sheet discharge tray, and at the worst, the one or more documents may fall from the sheet discharge tray.

For example, a projection, which serves as a stopper, may be provided at one end of the sheet discharge tray to resolve the above problem. When the previously-discharged document placed on the sheet discharge tray is pushed by the next discharged document, a leading edge of the previously-discharged document may come into contact with the projection. Therefore, the projection may prevent one or more discharged documents placed on the sheet discharge tray from being further pushed downward in the document conveying direction on the sheet discharge tray.

However, the provision of such a projection may increase the protruding amount at the sheet discharge tray by the same amount as a protruding amount of the projection. Thus, the height of the image-reading device may increase as compared with an image-reading device having a sheet discharge tray with no projection.

Similar to the sheet feed tray of the known image-reading device, the sheet discharge tray may be configured to retract such that the upper surface of the sheet discharge tray may face downward. With this configuration, the projection provided at the upper surface of the sheet discharge tray may be placed to protrude downward.

However, the sheet discharge tray may need to be disposed such that the projection does not interfere with components provided in a main body of the image-reading device. In this case, also, the sheet discharge tray may be disposed higher than a sheet discharge tray without such a projection. Therefore, the height of the image-reading device may increase.

An illustrative embodiment of the disclosure provides for a sheet conveyor device that may keep its height although the sheet conveyor device is provided with a projection at a sheet receiving surface that receives one or more sheets discharged from a sheet outlet port, and an image-reading device having a configuration similar to the sheet conveyor device.

DESCRIPTION OF THE DRAWINGS

For a more complete understanding of the present disclosure, needs satisfied thereby, and the objects, features, and advantages thereof, reference now is made to the following descriptions taken in connection with the accompanying drawing.

DETAILED DESCRIPTION OF EMBODIMENT

Hereinafter, one or more aspects of the disclosure are described.

Figure 1A:
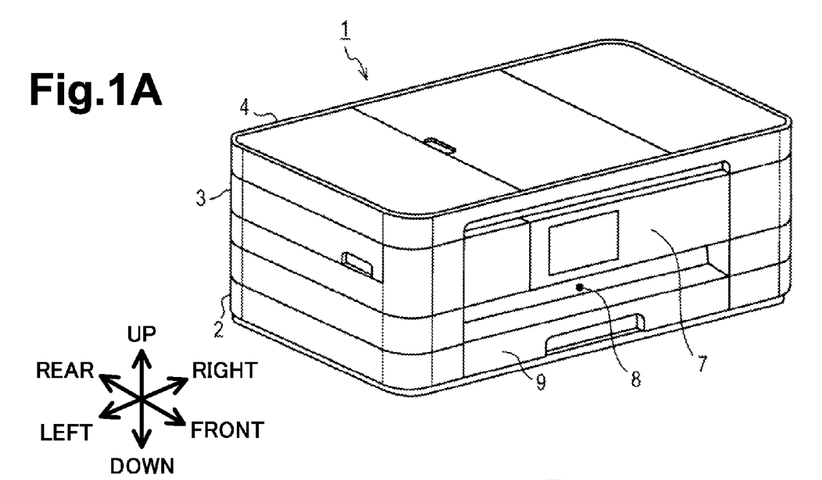
FIG. 1A is a perspective view depicting a multifunction peripheral wherein a document conveyor unit disposed above a reading unit is closed in an illustrative embodiment according to one or more aspects.
Figure 1B:
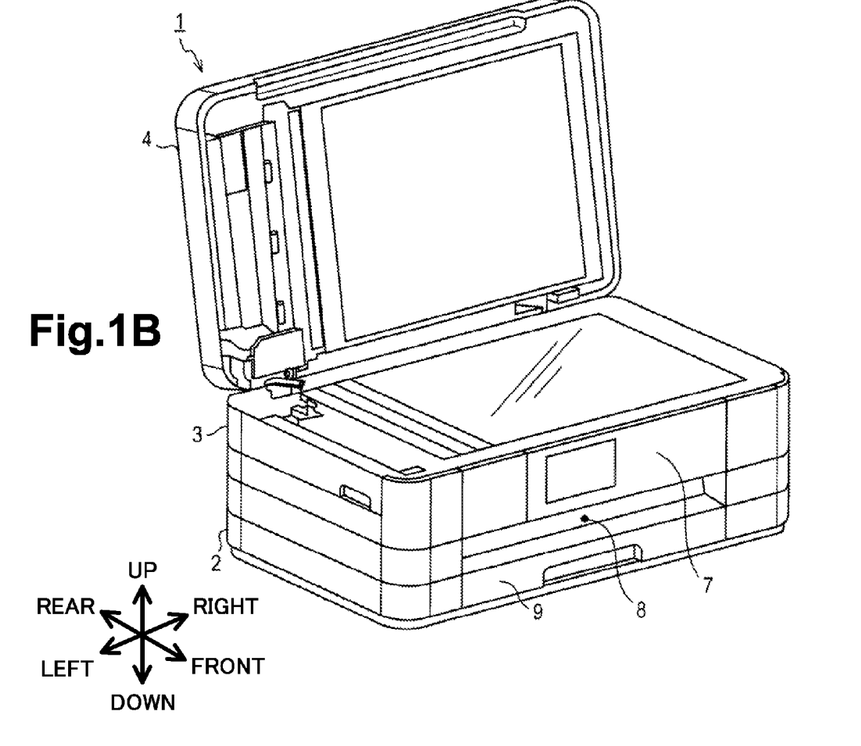
FIG. 1B is a perspective view depicting the multifunction peripheral wherein the document conveyor unit is opened in the illustrative embodiment according to one or more aspects.

As depicted in FIGS. 1A and 1B, a multifunction peripheral 1 may comprise a main unit 2, a reading unit 3, and a sheet conveyor device, for example a document conveyor unit 4. Hereinafter, description is made with reference to directions, e.g., up, down, right, left, front and rear, as shown in the drawing of FIG. 1A. The reading unit 3 may be disposed above the main unit 2. The document conveyor unit 4 may be disposed above the reading unit 3.

The main unit 2 may comprise an image forming portion, a control device, and a power source device, for example. The control device may be configured to control mechanisms disposed in the main unit 2, the reading unit 3, and the document conveyor unit 4.

The reading unit 3 may be configured to be pivotable about an axis, which may extend along a right-left direction near rear edges of the main unit 2 and reading unit 3, with respect to the main unit 2. When a forward part of the reading unit 3 is moved upward by pivoting the reading unit 3, an upper opening of the main unit 2 may appear, and this condition may allow maintenance to be performed for each unit or each portion (for example, the image forming portion, the control device, and the power source device) disposed inside the main unit 2.

The document conveyor unit 4 may be configured to be pivotable about an axis, which may extend along the right-left direction near rear edges of the reading unit 3 and the document conveyor unit 4, with respect to the reading unit 3. The document conveyor unit 4 may be configured to be movable between a closed position (see FIG. 1A) and an opened position (see FIG. 1B) in accordance with the pivoting of the document conveyor unit 4.

When the document conveyor unit 4 is located in the opened position, a document receiving surface may appear at an upper surface of the reading unit 3. When the document conveyor unit 4 is located in the closed position, the document conveyor unit 4 may serve as a cover that may cover the document receiving surface.

The main unit 2 may comprise a control panel 7 at an upper front part of the main unit 2. The control panel 7 may be configured to be operated by a user. The main unit 2 may further comprise a sheet feed cassette 9 at a lower part of the main unit 2. The sheet feed cassette 9 may be configured to accommodate one or more recording media on which printing is to be performed. The main unit 2 may have a sheet discharge port 8 above the sheet feed cassette 9. A recording medium on which printing is performed may be discharged from the discharge port 8.

Figure 2:
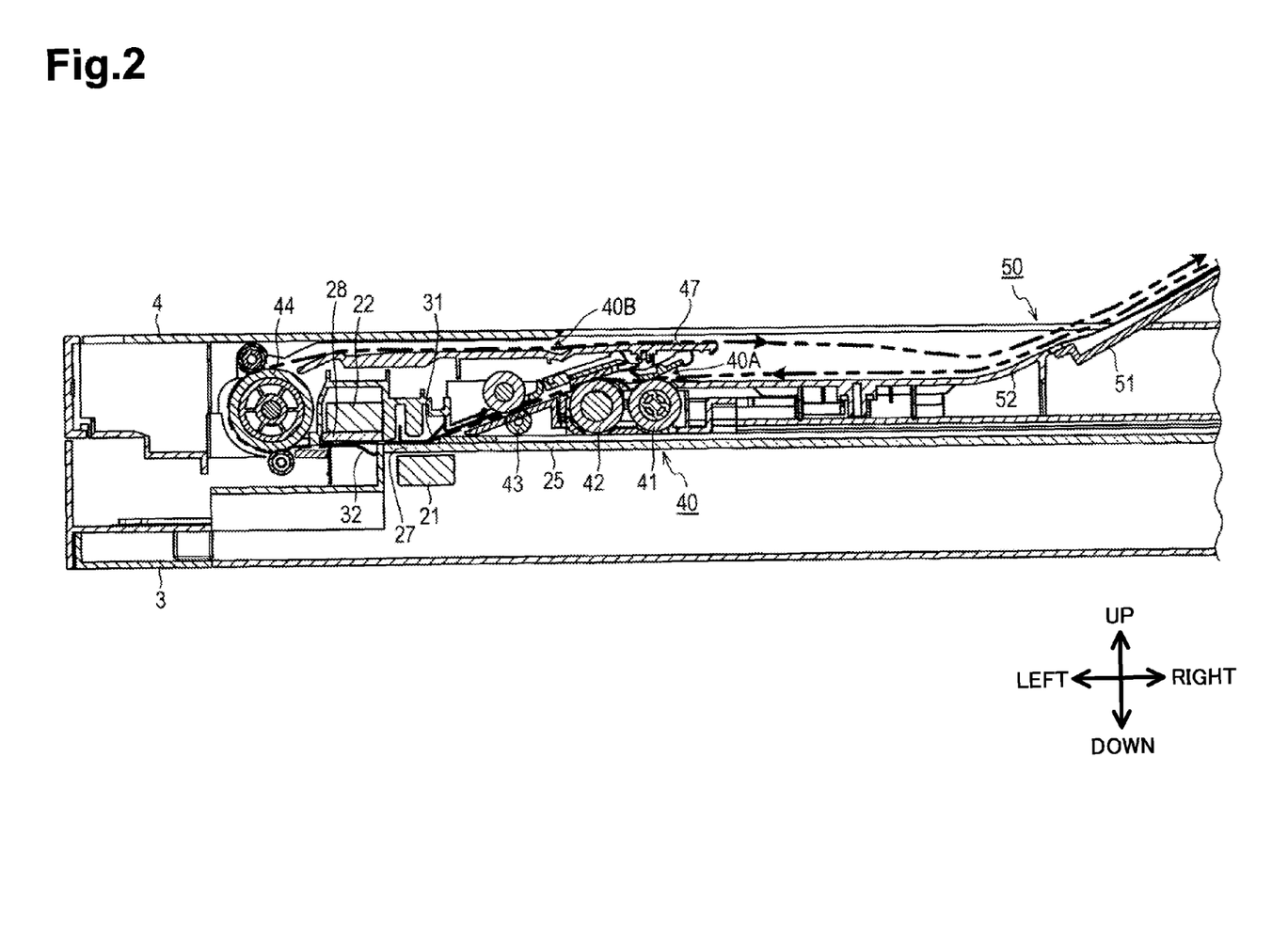
FIG. 2 is a longitudinal sectional view depicting an internal configuration of the document conveyor unit in the illustrative embodiment according to one or more aspects.

As depicted in FIG. 2, the reading unit 3 may comprise a reading device, for example a first image sensor 21, and the document conveyor unit 4 may comprise another reading device for example a second image sensor 22. In this illustrative embodiment, the first image sensor 21 and the second image sensor 22 may both be contact image sensors.

The first image sensor 21 may be configured to move back and forth inside the reading unit 3 along the right-left direction (a sub-scanning direction) by a motor (not depicted). The second image sensor 22 may be fixed to an inside frame of the document conveyor unit 4.

In the reading unit 3, a transparent portion for stationary document 25 and a first transparent portion for moving document 27 may be disposed above the movement path of the first image sensor 21. In the document conveyor unit 4, a second transparent portion for moving document 28 may be disposed under the second image sensor 22.

The transparent portion for stationary document 25 and the first transparent portion for moving document 27 may define an upper surface of the reading unit 3. In this illustrative embodiment, a single glass plate may constitute the transparent portion for stationary document 25 and the first transparent portion for moving document 27. Another glass plate may be used for the second transparent portion for moving document 28.

Separate glass plates may be used for the transparent portion for stationary document 25 and the first transparent portion for moving document 27. Material other than glass may be used for the transparent portion for stationary document 25 and the first and second transparent portions for moving documents 27, 28 as long as the material is transparent and the first and second image sensors 21, 22 can read a document therethrough.

In the document conveyor unit 4, a first document pressing member 31 may be disposed above the first transparent portion for moving document 27. In the reading unit 3, a second document pressing member 32 may be disposed under the second transparent portion for moving document 28.

The first document pressing member 31 may be urged downward by a compression spring (not depicted) to lightly press the upper surface of the first transparent portion for moving document 27. The second document pressing member 32 may be urged upward by a compression spring (not depicted) to lightly press a lower surface of the second transparent portion for moving document 28.

The document conveyor unit 4 may comprise a conveyor, for example a conveyor mechanism 40, configured to convey a document. The conveyor mechanism 40 may comprise a plurality of rollers, e.g., a supply roller 41, a separating roller 42, a conveyor roller 43, a reverse roller 44. The conveyor mechanism 40 may be configured to convey a document along a document conveying path, which is indicated by a double dashed line in FIG. 2, by the plurality of rollers.

The document conveyor unit 4 may comprise a cover portion 47 configured to partially cover the conveyor mechanism 40 (the supply roller 41, the separating roller 42, and the conveyor roller 43) from above. A document inlet port 40A for introducing a document into the conveyor mechanism 40 may be defined under the cover portion 47. A document outlet port 40B for discharging the document from the conveyor mechanism 40 may be defined above the cover portion 47.

Figure 3A:
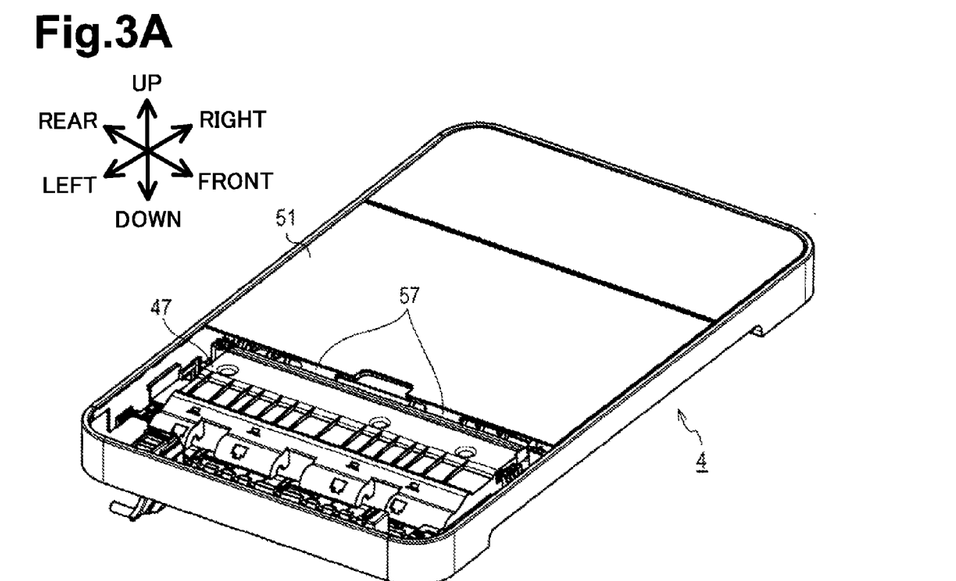
FIG. 3A is a perspective view depicting the document conveyor unit wherein a movable sheet-receiving portion of a sheet receiving portion is closed in the illustrative embodiment according to one or more aspects.
Figure 3B:
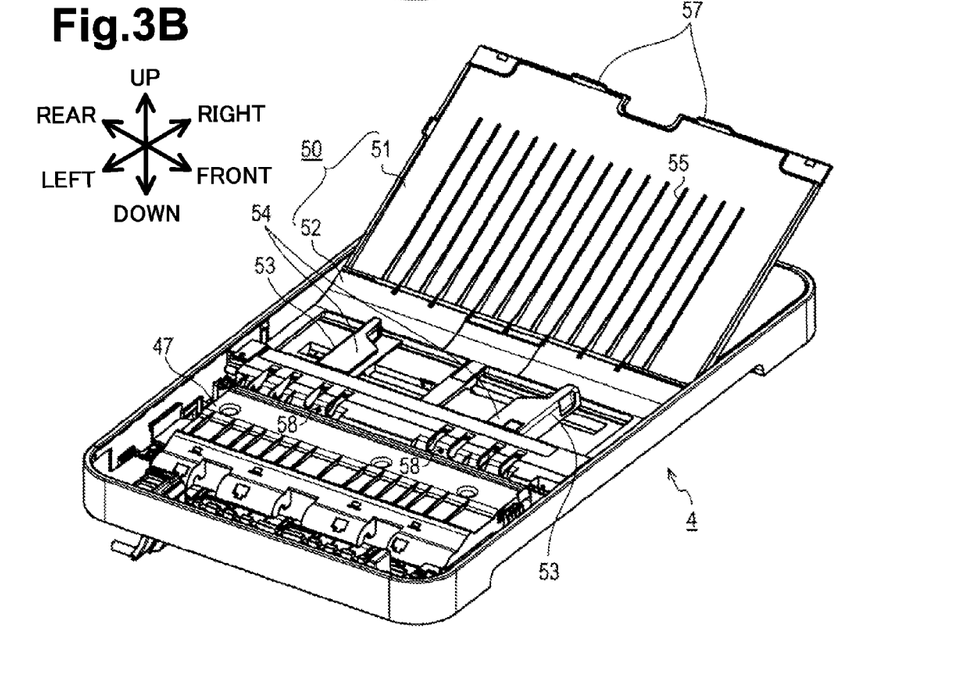
FIG. 3B is a perspective view depicting the document conveyor unit wherein the movable sheet-receiving portion is opened in the illustrative embodiment according to one or more aspects.

As depicted in FIGS. 3A and 3B, the document conveyor unit 4 may comprise a sheet receiving portion 50 at its upper surface. The sheet receiving portion 50 may comprise a movable member, for example a movable sheet-receiving portion 51, and a fixed sheet-receiving portion 52. The document discharged from the document outlet port 40B by the conveyor mechanism 40 may pass over an upper surface of the cover portion 47 and reach the sheet receiving portion 50.

The movable sheet-receiving portion 51 may be configured to be pivotable about an axis, which may extend along a front-rear direction, with respect to the document conveyor unit 4. In accordance with the pivoting of the movable sheet-receiving portion 51, the movable sheet-receiving portion 51 may be moved between a closed position (see FIG. 3A) and an opened position (see FIG. 3B).

When the movable sheet-receiving portion 51 is located in the closed position, an upper surface of the movable sheet-receiving portion 51 may extend substantially along a horizontal direction and the movable sheet-receiving portion 51 may function as an exterior cover for covering the upper surface of the document conveyor unit 4. When the movable sheet-receiving portion 51 is located in the opened position, a surface, which may define a lower surface of the movable sheet-receiving portion 51 when located in the closed position, of the movable sheet-receiving portion 51 may face diagonally upward and become an inclined surface.

When the movable sheet-receiving portion 51 is located in the opened position, the fixed sheet-receiving portion 52 may be exposed at a position that may be covered by the movable sheet-receiving portion 51 located in the closed position. The movable sheet-receiving portion 51 and the fixed sheet-receiving portion 51 may be disposed next to each other to constitute the sheet receiving portion 50. Under this condition, the movable sheet-receiving portion 51 may be disposed opposite to the document inlet port 40A and the document outlet port 40B with respect to the fixed sheet-receiving portion 52. Neighboring areas existing on opposite sides of a border between the movable sheet-receiving portion 51 and the fixed sheet-receiving portion 52 may be available to be used as the sheet receiving surface.

The fixed sheet-receiving portion 52 may comprise a pair of side guides 53. The pair of side guides 53 may be configured to be slidable along the front-rear direction. In accordance with the sliding of one of the side guides 53, the other of the side guides 53 may slide along a direction reverse to a direction that the one of the side guides 53 may slide. Therefore, the side guides 53 may be allowed to slide along directions that they may get closer to each other or they may be separated from each other for changing a distance between the side guides 53 by which one of the side guides 14 may be moved in a desired direction.

Each of the side guides 53 may comprise a partition 54. The partition 54 may be a plate-shaped member that may extend from an upper edge of each side guide 53 toward the other side guide 53. One or more documents to be conveyed may be placed under the partitions 54 of the side guides 53. Under this condition, the side guides 53 may make contact with side edges, which may extend parallel to a document conveying direction, of the one or more documents to restrict the document conveying direction. The document conveyed along the document conveying path (described later) may be discharged above the partitions 54 of the side guides 53. Then, the document may pass over the upper surface of the fixed sheet-receiving portion 52 and reach the upper surface of the movable sheet-receiving portion 51.

The movable sheet-receiving portion 51 may comprise a plurality of ribs 55 (for example, 15 ribs in this illustrative embodiment) that may extend along a direction parallel to the direction that the conveyor mechanism 40 may convey a document. Upper edges of the plurality of ribs 55 may define the sheet receiving surface. The plurality of ribs 55 may provide gap between a discharged document and the sheet receiving surface to reduce a contact area between the document and the sheet receiving surface. With this configuration, frictional resistance to the document may be reduced.

The movable sheet-receiving portion 51 may comprise regulating portions 57 that may protrude from an upper end of the sheet receiving surface of the movable sheet-receiving portion 51 when the movable sheet-receiving portion 51 is located in the opened position. The regulating portions 57 may be integrally formed with the movable sheet-receiving portion 51. The regulating portions 57 may be configured to come into contact with leading edges of one or more documents discharged from the document outlet port 40B onto the sheet receiving surface of the movable sheet-receiving portion 51 and restrict the further conveyance of the one or more documents placed on the sheet receiving surface of the movable sheet-receiving portion 51 along a document discharge direction.

Figure 4A:
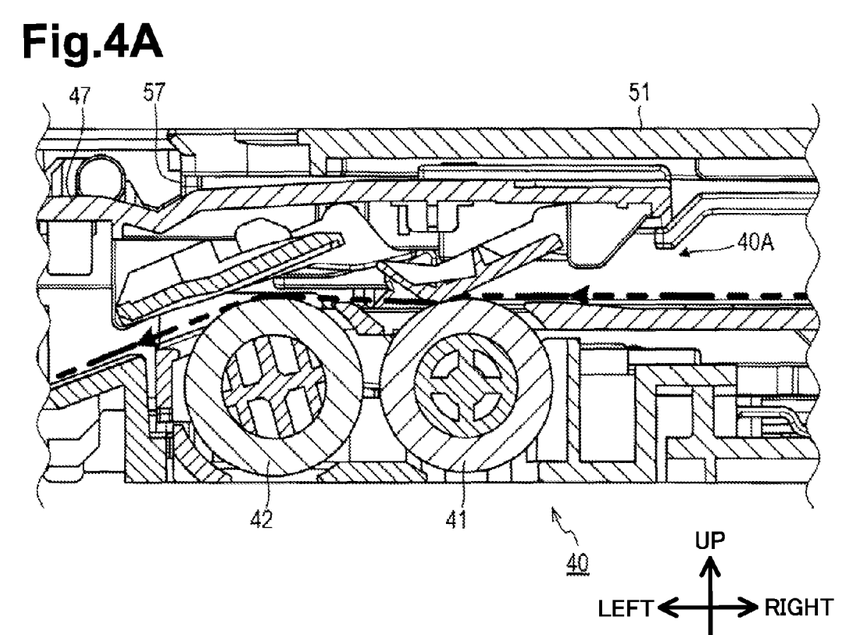
FIG. 4A is an enlarged longitudinal sectional view depicting an area where regulating portions and recessed portions are not provided in a conveyor mechanism wherein the movable sheet-receiving portion is closed in the illustrative embodiment according to one or more aspects.

The cover portion 47 may have recessed portions 58 in its upper surface. As depicted in FIG. 2, the separating roller 42 may be disposed under the cover portion 47 at a middle part in a width direction of the multifunction peripheral 1 (the front-rear direction of the multifunction peripheral 1) orthogonal to the document conveying direction. The recessed portions 58 may be provided on opposite sides of the separating roller 42 with respect to the width direction to avoid interference so that the separating roller 42 does not enter into the recessed portions 58. Since FIG. 4A is a longitudinal sectional view depicting a middle part of the conveyor mechanism 40 including the separating roller 42 with respect to the front-rear direction, the separating roller 42 is depicted but the recessed portions 58 are not depicted. Since FIG. 4B is a longitudinal sectional view depicting a part of the conveyor mechanism 40 including the recessed portions 58, one of the recessed portions 58 is depicted but the separating roller 42 is not depicted.

Figure 4B:
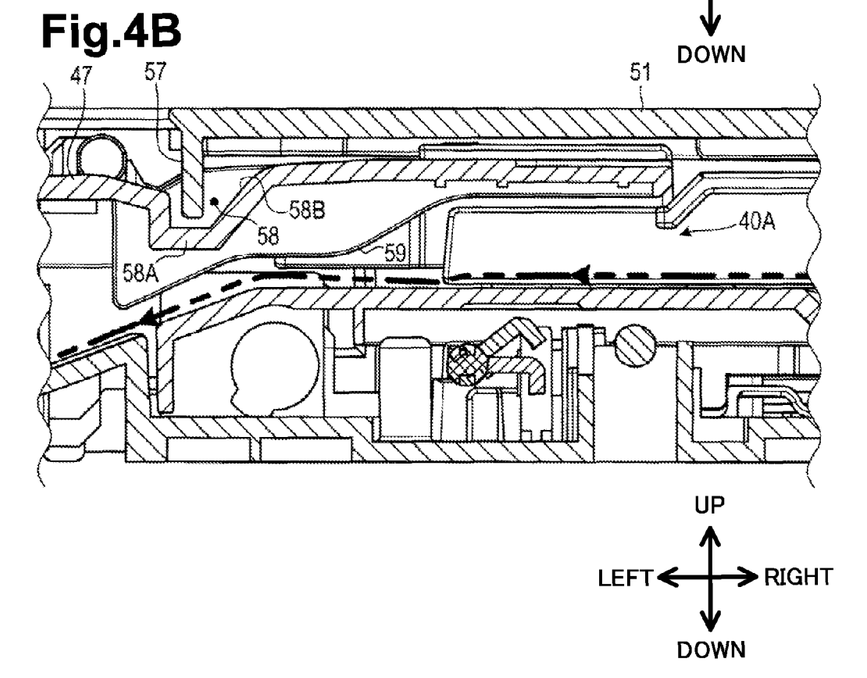
FIG. 4B is an enlarged longitudinal sectional view depicting an area where one of the regulating portions and one of the recessed portions are provided in the conveyor mechanism wherein the movable sheet-receiving portion is closed in the illustrative embodiment according to one or more aspects.

As depicted in FIG. 4B, each of the recessed portions 58 may have a bottom 58A (that is, the recessed portions 58 may not be penetrated in an upper-lower direction). When the movable sheet-receiving portion 51 is located in the closed position, the regulating portions 57 may be located in the respective recessed portions 58. That is, the regulating portions 57 may be disposed at positions corresponding to the respective recessed portions 58.

The cover portion 47 may comprise guide ribs 59 at its lower surface. The guide ribs 59 may protrude downward from the lower surface of the cover portion 47. Lower edges of the guide ribs 59 may define an area functioning as the document conveying path. Each of the recessed portions 58 may have the bottom 58A that may be located above the lower edges of the guide ribs 59. This configuration may prevent a document, which is being guided along the lower edges of the guide ribs 59, from coming into contact with the bottoms 58A of the recessed portions 58.

Each of the recessed portions 58 may comprise a side wall 58B that may be one of side walls of each of the recessed portions 58. A downstream side-wall with respect to the document conveying direction may be referred to as the side wall 58B. In each of the recessed portions 58, the side wall 58B may be inclined downstream from the bottom 58A toward an opening of the recessed portion 58 with respect to the document conveying direction (that is, an up slope from the lower left toward the upper right in FIG. 4B).

According to the multifunction peripheral 1 configured as described above, when the movable sheet-receiving portion 51 is located in the closed position, the surface used as the sheet receiving surface may face downward and the movable sheet-receiving portion 51 may serve as a part of an exterior of the upper surface of the multifunction peripheral 1. Therefore, the protruding amount on the upper-surface side of the multifunction peripheral 1 in its height direction may be restricted as compared with a multifunction peripheral that may comprise an equivalent of the movable sheet-receiving portion 51 that may fixedly disposed at a position where the movable sheet-receiving portion 51 may be located in the opened position.

In the above-described illustrative embodiment, when the movable sheet-receiving portion 51 is located in the opened position, the conveyor mechanism 40 may discharge a document onto the sheet receiving surface that may face diagonally upward. In addition, the regulating portions 57 may come into contact with leading edges of one or more documents to restrict the further conveyance of the one or more documents with respect to the document discharge direction. Therefore, this configuration may prevent or reduce the occurrence of the one or more documents falling off the sheet receiving surface due to excessive conveyance along the document discharge direction.

In the above-described illustrative embodiment, when the movable sheet-receiving portion 51 is located in the closed position, the regulating portions 57 may be located in the respective recessed portions 58 provided in the cover portion 47. Therefore, the movable sheet-receiving portion 51 may be located closer to the cover portion 47 as compared with a case where the cover portion 47 may not have the recessed portions 58. Accordingly, the height of the multifunction peripheral 1 may be reduced.

In the above-described illustrative embodiment, the recessed portions 58 may be disposed not to overlap the separating roller 42 when viewed from above of the multifunction peripheral 1. Therefore, the cover portion 47 may be disposed at the lower position as compared with a case where the recessed portions 58 may be disposed to overlap one or more rollers, for example, the separating roller 42 when viewed from above of the multifunction peripheral 1. Thus, the height of the multifunction peripheral 1 may be reduced.

In the above-described illustrative embodiment, the regulating portions 57 may be integrally provided with the movable sheet-receiving portion 51. Therefore, this configuration may reduce parts count for the multifunction peripheral 1 and the number of man-hours needed to assemble the multifunction peripheral 1 as compared with a case where equivalents of the regulating portions 57 may be separately provided and attached to the movable sheet-receiving portion 51.

In the above-described illustrative embodiment, the recessed portions 58 may be disposed on the opposite sides of the separating roller 42 with respect to the width direction of the multifunction peripheral 1, and the regulating portions 57 may be disposed at their positions corresponding to the respective recessed portions 58. Therefore, the two regulating portions 57 may protrude from the positions that may be separated from each other. This configuration may regulate the movement of one or more documents by which the regulating portions 57 may come into contact with the one or more documents within a wider area with respect to the width direction as compared with a case where a single regulating portion having the same dimension as each of the regulating portions 57 of the above-described illustrative embodiment may be disposed.

In the above-described illustrative embodiment, each of the recessed portions 58 may include a bottom 58A. This configuration may prevent or reduce entry of dust inside of the multifunction peripheral 1 via the recessed portions 58 as compared with a case where the recessed portions 58 may not include a bottom 58A.

In the above-described illustrative embodiment, the bottom 58A of each of the recessed portions 58 may be disposed above the lower edges of the guide ribs 59 that may be disposed at the lower surface of the cover portion 47. When a document is conveyed along the document conveying path defined by the lower edges of the guide ribs 59, the bottom 58A of each of the recessed portions 58 may not be an obstruction to the conveyance of the document. Thus, the multifunction peripheral 1 may convey a document without trouble.

In the above-described illustrative embodiment, the side wall 58B of each of the recessed portions 58 may be inclined as described above. With this configuration, when a leading edge of a document is caught in one or both of the recessed portions 58, the leading edge of the document may be released from the one or both of the recessed portions 58 smoothly along the inclined side wall 58B. Thus, the recessed portions 58 may not become an obstruction to the conveyance of the document.

While the disclosure has been described in detail with reference to the specific illustrative embodiments thereof, it would be apparent to those skilled in the art that various changes, arrangements and modifications may be applied therein without departing from the spirit and scope of the disclosure.

In the above-described illustrative embodiment, the bottom 58A of each of the recessed portions 58 may be disposed above the lower edges of the guide ribs 59 that may be disposed at the lower surface of the cover portion 47. There may be no problem in the function of the guide ribs 59 as long as the bottom 58A may not protrude from the lower edges of the guide ribs 59. In other embodiments, for example, the bottom 58A of each of the recessed portions 58 may be located at the same level as the lower edges of the guide ribs 59 are located in an up-down direction. In this case, also, bottoms 58A may not become obstructions to the conveyance of the document and the multifunction peripheral 1 may convey the document without trouble.

In the above-described illustrative embodiment, the sheet conveyor device equipped in the image-reading device may be described as an example of the sheet conveyor device. The sheet conveyor device according to the one or more aspects of the disclosure may be adopted in an image forming apparatus that may be configured to form (record) an image onto a recording sheet. For example, when the sheet conveyor device according to the one or more aspects of the disclosure is adopted in a conveyor mechanism of the image forming apparatus, one or more recording sheets may be prevented from falling from the sheet receiving surface due to the excessive conveyance with respect to the sheet discharge direction after an image is formed on the one or more recording sheets.

In the above-described illustrative embodiment, the image-reading device configured as the multifunction peripheral may be described as an example of the image-reading device of the disclosure. Nevertheless, in other embodiments, for example, the image-reading device may not be the multifunction peripheral. The sheet conveyor device may be adopted in an image-reading device having a single function or an image forming apparatus having a single function.

What is claimed is:

1. A sheet conveyor device comprising:
a conveyor configured to convey a sheet along a conveying path that extends from an inlet port to an outlet port, and discharge the sheet from the outlet port;
a cover configured to cover at least a part of the conveyor; and
a sheet receiving portion configured to receive the sheet discharged from the outlet port, the sheet receiving portion comprising:
a movable member configured to move between
a first position where the movable member covers at least a part of an upper side of the cover, forms a part of an exterior surface of the sheet conveyor device and includes a surface that faces downward, and
a second position where the surface of the movable member faces upward and the movable member is configured to function as a sheet receiving surface; and
a protruding portion configured to protrude from the surface of the movable member, the protruding portion being located on an upper portion of the movable member when the movable member is located in the second position, and being fixed relative to the movable member and configured to prevent the sheet discharged from the outlet port from falling off the sheet receiving portion; and
the cover having a recessed portion configured to receive the protruding portion when the movable member is located in the first position.

2. The sheet conveyor device according to claim 1, wherein the conveyor includes a conveyor mechanism, the recessed portion being disposed to not overlap the conveyor mechanism when viewed in a direction perpendicular to the movable member when the movable member is located in the first position.

3. The sheet conveyor device according to claim 1, wherein the conveyor includes a plurality of rollers,
wherein the cover has a plurality of recessed portions, one of which is disposed on one side of at least one of the plurality of rollers and another of which is disposed on another side of the at least one of the plurality of rollers, and
wherein the sheet receiving portion comprises a plurality of protruding portions including the protruding portion, each of the recessed portions configured to receive a corresponding one of the protruding portions when the movable member is located in the first position.

4. The sheet conveyor device according to claim 1, wherein the recessed portion has a side and a bottom and the cover further comprises a rib that protrudes downward from a lower surface of the cover and is disposed between the bottom of the recessed portion and the conveying path, the rib being configured to guide the sheet along the conveying path.

5. The sheet conveyor device according to claim 1, wherein the recessed portion has a side and a bottom and the conveyor is configured to discharge the sheet from the outlet port onto the sheet receiving portion with an upper-surface side of the cover having the recessed portion configured to guide the sheet in a conveying direction, and
wherein the side of the recessed portion comprises side walls defining inner surfaces of the recessed portion, the recessed portion having an upper opening, wherein a downstream side-wall of the side walls in the conveying direction is inclined upward from the bottom to the upper opening in the conveying direction.

6. The sheet conveyor device according to claim 1, wherein the protruding portion is configured to prevent the sheet discharged from the outlet port from falling off the sheet receiving portion in a conveying direction.

7. A sheet conveyor device comprising:
a conveyor configured to convey a sheet along a conveying path that extends from an inlet port to an outlet port, and discharge the sheet from the outlet port;
a sheet receiving portion configured to receive the sheet discharged from the outlet port, the sheet receiving portion comprising:
a movable member configured to move between
a first position where the movable member covers at least a part of an upper side of the conveyor, forms a part of an exterior surface of the sheet conveyor device and includes a surface that faces downward, and
a second position where the surface of the movable member faces upward, the movable member is configured to function as a sheet receiving surface; and
a protruding portion configured to protrude from the surface of the movable member, the protruding portion being located on an upper portion of the movable member when the movable member is located in the second position, and being fixed relative to the movable member and configured to prevent the sheet discharged from the outlet port from falling off the sheet receiving portion; and
a recessed portion having a bottom, side walls and an upper opening disposed opposite the bottom, the recessed portion configured to receive the protruding portion through the upper opening when the movable member is located in the first position.

8. The sheet conveyor device according to claim 7, wherein the conveyor includes a conveyor mechanism, the recessed portion being disposed to not overlap the conveyor mechanism when viewed in a direction perpendicular to the movable member when the movable member is located in the first position.

9. The sheet conveyor device according to claim 7, wherein the conveyor includes a plurality of rollers,
wherein the sheet conveyor device further includes a plurality of recessed portions, one of which is disposed on one side of at least one of the plurality of rollers and another of which is disposed on another side of the at least one of the plurality of rollers, and
wherein the sheet receiving portion comprises a plurality of protruding portions including the protruding portions, each of the recessed portions configured to receive a corresponding one of the protruding portions when the movable member is located in the first position.

10. The sheet conveyor device according to claim 7, wherein the recessed portion is disposed between the protruding portion and the conveying path when the movable member is located in the first position.

11. The sheet conveyor device according to claim 7, wherein the recessed portion has a side and a bottom and the conveyor is configured to discharge the sheet from the outlet port onto the sheet receiving portion, and
wherein the side of the recessed portion comprises side walls defining inner surfaces of the recessed portion, the recessed portion having an upper opening, wherein a downstream side-wall of the side walls in the conveying direction is inclined upward from the bottom to the upper opening in the conveying direction.

12. The sheet conveyor device according to claim 7, wherein the protruding portion is configured to prevent the sheet discharged from the outlet port from falling off the sheet receiving portion in a conveying direction.

13. An image-reading device comprising:
a conveyor configured to convey a sheet along a conveying path that extends from an inlet port to an outlet port, and discharge the sheet from the outlet port;
a cover configured to cover at least a part of the conveyor;
a sheet receiving portion configured to receive the sheet discharged from the outlet port, the sheet receiving portion comprising:
a movable member configured to move between
a first position where the movable member covers at least a part of an upper side of the conveyor, forms a part of an exterior surface of the image-reading device and includes a surface that faces downward, and
a second position where the surface of the movable member faces upward, the movable member is configured to function as a sheet receiving surface; and
a protruding portion configured to protrude from the surface of the movable member, the protruding portion being located on an upper portion of the movable member when the movable member is located in the second position, and being fixed relative to the movable member and configured to prevent the sheet discharged from the outlet port from falling off the sheet receiving portion; and
a reading device configured to read an image from the sheet being conveyed by the conveyor; and
the cover having a recessed portion configured to receive the protruding portion when the movable member is located in the first position.

14. The image-reading device according to claim 13, wherein the conveyor includes a conveyor mechanism, the recessed portion being disposed to not overlap the conveyor mechanism when viewed in a direction perpendicular to the movable member when the movable member is located in the first position.

15. The image-reading device according to claim 13, wherein the conveyor includes a plurality of rollers,
wherein the cover has a plurality of recessed portions, one of which is disposed on one side of at least one of the plurality of rollers and another of which is disposed on another side of the at least one of the plurality of rollers, and
wherein the sheet receiving portion comprises a plurality of protruding portions including the protruding portion, each of the recessed portions configured to receive a corresponding one of the protruding portions when the movable member is located in the first position.

16. The image-reading device according to claim 13, wherein the recessed portion has a side and a bottom and the cover further comprises a rib that protrudes downward from a lower surface of the cover and is disposed between the bottom of the recessed portion and the conveying path, the rib being configured to guide the sheet along the conveying path.

17. The image-reading device according to claim 13, wherein the recessed portion has a side and a bottom and the conveyor is configured to discharge the sheet from the outlet port onto the sheet receiving portion with an upper-surface side of the cover having the recessed portion configured to guide the sheet in a conveying direction, and
wherein the side of the recessed portion comprises side walls defining inner surfaces of the recessed portion, the recessed portion having an upper opening, wherein a downstream side-wall of the side walls in the conveying direction is inclined upward from the bottom to the upper opening in the conveying direction.

18. A sheet conveyor device comprising:
a conveyor including a plurality of rollers configured to convey a sheet along a conveying path that extends from an inlet port to an outlet port, and discharge the sheet from the outlet port;
a cover configured to cover at least a part of the conveyor, the cover including a plurality of recessed portions one of which is disposed on one side of at least one of the plurality of rollers and another of which is disposed on another side of the at least one of the plurality of rollers; and
a sheet receiving portion configured to receive the sheet discharged from the outlet port, the sheet receiving portion comprising:
a movable member configured to move between
a first position where the movable member covers at least a part of an upper side of the cover, forms a part of an exterior surface of the sheet conveyor device and includes a surface that faces downward, and
a second position where the surface of the movable member faces upward and the movable member is configured to function as a sheet receiving surface; and
a plurality of protruding portions configured to protrude from the surface of the movable member, the plurality of protruding portions being located on an upper portion of the movable member when the movable member is located in the second position; and
wherein each of the recessed portions is configured to receive a corresponding one of the plurality of protruding portions when the movable member is located in the first position.

19. A sheet conveyor device comprising:
a conveyor including a plurality of rollers configured to convey a sheet along a conveying path that extends from an inlet port to an outlet port, and discharge the sheet from the outlet port;
a sheet receiving portion configured to receive the sheet discharged from the outlet port, the sheet receiving portion comprising:
a movable member configured to move between
a first position where the movable member covers at least a part of an upper side of the conveyor, forms a part of an exterior surface of the sheet conveyor device and includes a surface that faces downward, and
a second position where the surface of the movable member faces upward, the movable member is configured to function as a sheet receiving surface; and
a plurality of protruding portions configured to protrude from the surface of the movable member, the plurality of protruding portions being located on an upper portion of the movable member when the movable member is located in the second position; and
a plurality of recessed portions each having a bottom, side walls and an upper opening disposed opposite the bottom, one recessed portion being disposed on one side of at least one of the plurality of rollers and another recessed portion being disposed on another side of the at least one of the plurality of rollers, and each of the recessed portions is configured to receive a corresponding one of the plurality of protruding portions when the movable member is located in the first position.

20. An image-reading device comprising:
a conveyor including a plurality of rollers configured to convey a sheet along a conveying path that extends from an inlet port to an outlet port, and discharge the sheet from the outlet port;
a cover configured to cover at least a part of the conveyor, the cover including a plurality of recessed portions one of which is disposed on one side of at least one of the plurality of rollers and another of which is disposed on another side of the at least one of the plurality of rollers;
a sheet receiving portion configured to receive the sheet discharged from the outlet port, the sheet receiving portion comprising:
a movable member configured to move between
a first position where the movable member covers at least a part of an upper side of the conveyor, forms a part of an exterior surface of the image-reading device and includes a surface that faces downward, and
a second position where the surface of the movable member faces upward, the movable member is configured to function as a sheet receiving surface; and
a plurality of protruding portions configured to protrude from the surface of the movable member, the plurality of protruding portions being located on an upper portion of the movable member when the movable member is located in the second position; and
a reading device configured to read an image from the sheet being conveyed by the conveyor, wherein each of the recessed portions is configured to receive a corresponding one of the plurality of protruding portions when the movable member is located in the first position.

* * * * *